March 10, 1970     B. E. BISHOP     3,500,415
SECTOR ATTENUATION SCANNING DEVICE FOR AUTOMATIC
TRACKING ANTENNA SYSTEMS
Filed Nov. 12, 1968

RELATIONSHIP OF THE
TWO REFERENCE SIGNALS

RELATIONSHIP BETWEEN ATTENUATION
SECTOR POSITION AND ONE REFERENCE SIGNAL

UP ERROR

LEFT ERROR

DOWN ERROR

RIGHT ERROR

BRUCE E. BISHOP
INVENTOR.

BY *J. M. St. Amand*

ATTORNEY

United States Patent Office

3,500,415
Patented Mar. 10, 1970

3,500,415
SECTOR ATTENUATION SCANNING DEVICE FOR AUTOMATIC TRACKING ANTENNA SYSTEMS
Bruce E. Bishop, Riverside, Calif., assignor to the United States of America as represented by the Secretary of the Navy
Filed Nov. 12, 1968, Ser. No. 774,729
Int. Cl. G01s 5/02
U.S. Cl. 343—118                    5 Claims

ABSTRACT OF THE DISCLOSURE

A scanning device for an antenna tracking system utilizing a scanning disc transparent to incident RF energy except for an attenuation sector to derive a signal for sensing the pointing error of the antenna.

---

The invention herein described may be manufactured and used by or for the Government of the United States of America for governmental purposes without the payment of any royalties thereon or therefor.

This invention provides a means for deriving a signal from RF energy received from a remote source which in turn is used to determine the sense and magnitude of the pointing error of a tracking receiving antenna. This signal is fed to the tracking converter of an automatic tracking antenna system which derives the information required to move the antenna in such a manner as to correct for and minimize the pointing error. By keeping the antenna directed toward the RF source, the received signal will remain at a maximum.

There are two prior methods for deriving a tracking signal in general use; scanning or lobing method and the monopulse method. Much has been published discussing the relative advantages and disadvantages of these two prior methods. Since the present invention utilizes the lobing method for deriving error signals, comparisons will only be made with other systems using the lobing method.

Conical scanning is generally accomplished in one of three ways. The first utilizes a feed system whose electrical center rotates in a small circle concentric with the focus of a lens or reflector. The antenna beam lies along the surface of a cone whose apex coincides with the center of the aperture and whose included angle increases with the diameter of the feed circle. The received energy from a source situated along the mechanical axis of such a system is independent of feed position. A source off-axis generates a received signal modulated by the feed rotation. The amplitude and phase of this modulation with respect to a reference signal as produced by a generator connected to the shaft of the motor driving feed define the angular location of the source in space. In this method of scanning, the feed is described as nutating.

A second way a conical scan can be accomplished is by utilizing an electrically unbalanced dipole feed system. This arrangement produces an off-axis phase center and the structure is rotated about the dipole mechanical axis. This produces a modulation on the received signal which is processed as described in the previous example. The polarization of this system changes continuously with the angle of rotation of the feed, hence it is only useful for tracing circularly polarized sources.

The third method for producing a conical scan is by keeping the feed system fixed and wobbling the reflector about the system boresight axis. The reference generator is connected to the reflector drive motor in this method and the pointing error is derived in a similar manner as described before.

In the two methods using moving feed systems, disadvantages arise from the requirement for some sort of RF rotary joint between the movable feed and the stationary receiving system. This rotary joint is a source of unwanted attenuation for RF energy and a source of undesired noise for the sensitive receiving system presently being employed. For the nutating scanning and the wobbulating reflector systems, a decrease in antenna gain and an increase in the unwanted sidelobe level is also a penalty that is incurred by having the feed positioned off of the reflector axis. The mechanical considerations involved in moving large masses at high velocities limits the use of the wobbulating reflector to physically small, low-gain systems. Also, the physical size of the movable feed systems limits the scanning rates and sets a lower frequency limit for the antenna system. It is generally desirable to scan at rates considerably above any modulation rates which may be generated due to the spin of the RF source. The present invention overcomes the disadvantages of the prior systems described above by providing simple and reliable sector scanning for automatic tracking antennas. The elimination of rotary joints reduces system noise and minimizes attenuation losses. The location of the feed at the focal point permits optimization of gain and beam pattern characteristics and side lobes are minimized. The system is applicable to any size parabolic reflector and can be used with telemetry systems and with any tracking system which requires that the antenna pointing information be derived from the signal received from a remote RF source. This system is not restricted in its use to smaller size reflector systems as is the wobbulating reflector, but lends itself to use with all size reflectors. The mass of the scanning disc is small compared to the mass of feed systems, thus the invention can be applied to lower radio frequency antenna systems than would be permitted with movable feed systems. The cost of implementing this invention in comparison to the cost of implementing systems utilizing rotary joints, nutating or rotating feeds, wobbulating reflectors is considerably less, and the present system can be used with a variety of different feeds, either circularly or linearly polarized.

Other objects and many of the attendant advantages of this invention will become readily appreciated as the same becomes better understood by reference to the following detailed description when considered in connection with the accompanying drawings wherein.

Figure 1:
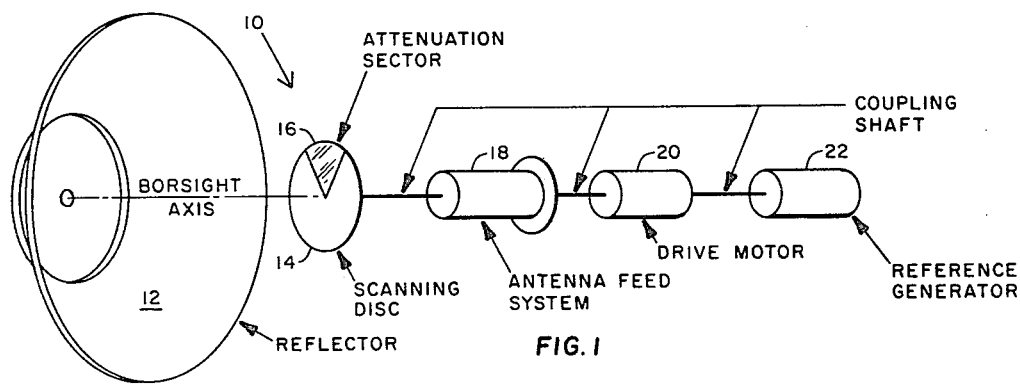
FIG. 1 is a diagrammatic illustration of the present invention.

The invention illustrated diagrammatically in FIG. 1 shows the scanning system 10 positioned in front of a reflector 12. The scanning system is mounted along the boresight axis of antenna reflector 12.

The scanning system consists of a scanning disc 14 which is transparent to the RF energy incident upon it except at an attenuation sector 16.

Figure 2:
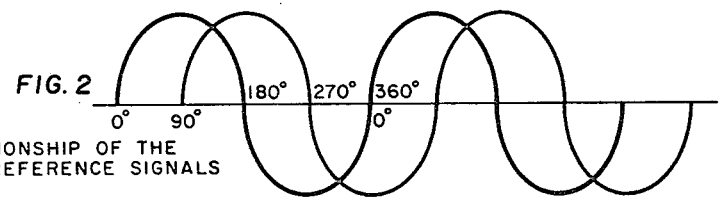
FIG. 2 illustrates the relationship of two reference signals.

Scanning disc 14 is rotated in front of the antenna feed system 18 by a drive motor 20. Drive motor 20 is in turn connected to a reference generator 22, thus the rotor in reference generator 22 and scanning disc 14 are rotating at the same rate. Reference generator 22 has two pairs of windings in quadrature that generate reference signals with a phase difference of 90° as shown in FIG. 2.

Figure 3:
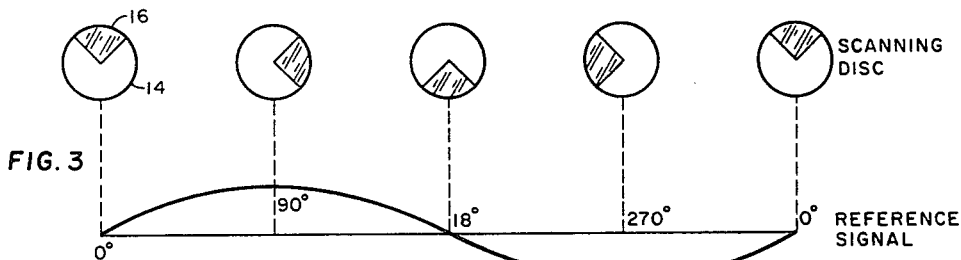
FIG. 3 illustrates the relationship betwen attenuation sector position and one reference signal.

Attenuation sector 16 of the scanning disc 14 is aligned to be in phase with one of the reference signals as indicated in FIG. 3.

A typical scanning disc 14 can be constructed, for example, approximately six inches in diameter and ⅛" thick and fabricated of polystyrene or some other suitable material which is transparent to RF energy incident upon it. One section 16 of the disc, pie-shaped or shaped to produce optimum results with a given feed system, is coated with a material which will absorb or deflect the RF energy incident upon it, such as aluminum foil or high loss dielectric material. This disc is then placed between the feed and the reflector of the antenna system as shown in FIG. 1 and described above, the center of disc 14 being aligned with the boresight axis of the antenna and the plane of the disc being perpendicular to it.

Figure 4:
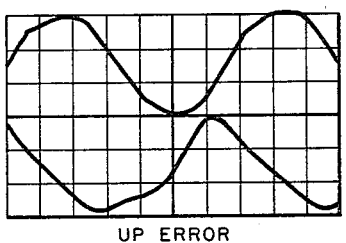
FIGS. 4 through 7 show typical received signal wave with respect to the RF source for up, left, down and right errors respectively.
Figure 5:
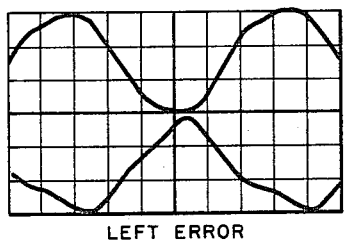
Figure 6:
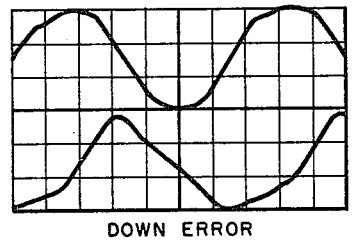
Figure 7:
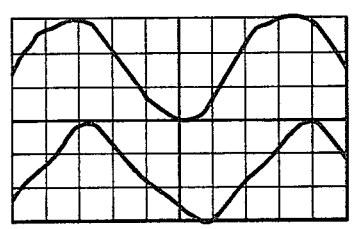

When the boresight axis of the antenna system is aligned with the direction to the RF energy source being received, attenuation sector 16 of scanning disc 14 modulates the energy incident upon the feed in a symmetrical manner and no pointing error signal is derived. However, if the boresight axis of the antenna system is pointing above the direction to the RF energy source, then the atenuation sector of the scanning disc modulates the energy incident upon the feed in an unsymmetrical manner such as to produce a received signal wave shape that indicates a pointing error in the up direction when compared to the reference signal as indicated by FIG. 4. In a similar manner, error signals are generated from which pointing information can be derived whenever the boresight axis is not in line to the RF energy source, as indicated in FIGS. 5, 6, and 7 which show received signal wave shapes with the antenna pointing to the left, below and to the right of the RF source. FIGS. 4, 5, 6, and 7 also show the relationship between the received signal and a reference signal. The reference signal is the top trace in each of the figures.

Various feeds can be used such as a circularly polarized helical feed. Also, a crossed log periodic array feed can be used. Proper phasing of the elements will permit a selection of right-hand circular, left-hand circular, vertical or horizontal polarization without changing the feed system and can be done electronically from a point remote to the feed systems, and this cannot be accomplished with prior type rotating or nutating feed scanning techniques without employing at least two concentric rotating RF joints with the aforemenioned drawbacks.

What is claimed is:

1. A sector attenuation scanning device for automatic tracking antenna systems, comprising in combination with the parabolic reflector of an antenna system:
    (a) an antenna feed system
    (b) a coupling shaft
    (c) a scanning disc transparent to incident RF energy, mounted on the end of said coupling shaft between the antenna reflector and said feed system,
    (d) a sector of said scanning disc being covered with a material which is not transparent to incident RF energy to form an attenuation sector,
    (e) a drive motor connected to said coupling shaft,
    (f) a reference generator also connected to said coupling shaft such that said scanning disc and said reference generator are rotated at the same rate by said drive motor,
    (g) said scanning disc, reference generator and drive motor being mounted along the boresight axis of the antenna reflector,
    (h) said reference generator having two pairs of windings in quadrature that generate reference signals with a 90° phase difference,
    (i) said sector of said scanning disc being aligned in phase with one of the reference signals generated by said reference generator, wherein when the boresight axis of an antenna system is aligned with the direction to an RF energy source being received said attenuation sector of the scanning disc modulates energy incident upon the feed in a symmetrical manner indicating no pointing error signal, whereas when the boresight axis is not aligned with the direction to the RF energy source said attenuation sector modulates the energy incident upon the antenna feed in an unsymmetrical manner to produce a pointing error signal.

2. A system as in claim 1 wherein said antenna feed is positioned at the antenna reflector focal point.

3. A system as in claim 1 wherein said scanning disc is polystyrene.

4. A system as in claim 1 wherein said attenuating sector is covered with aluminum foil.

5. A system as in claim 1 wherein said attenuating sector is a high loss dielectric material.

References Cited

UNITED STATES PATENTS

| | | |
|---|---|---|
| 2,420,264 | 5/1947 | Rost et al. |
| 2,515,248 | 7/1950 | McCoy. |
| 2,946,049 | 7/1960 | Stotz _____ 343—117 |

RICHARD A. FARLEY, Primary Examiner

R. E. BERGER, Assistant Examiner

U.S. Cl. X.R.

343—117, 761